United States Patent Office 3,151,207
Patented Sept. 29, 1964

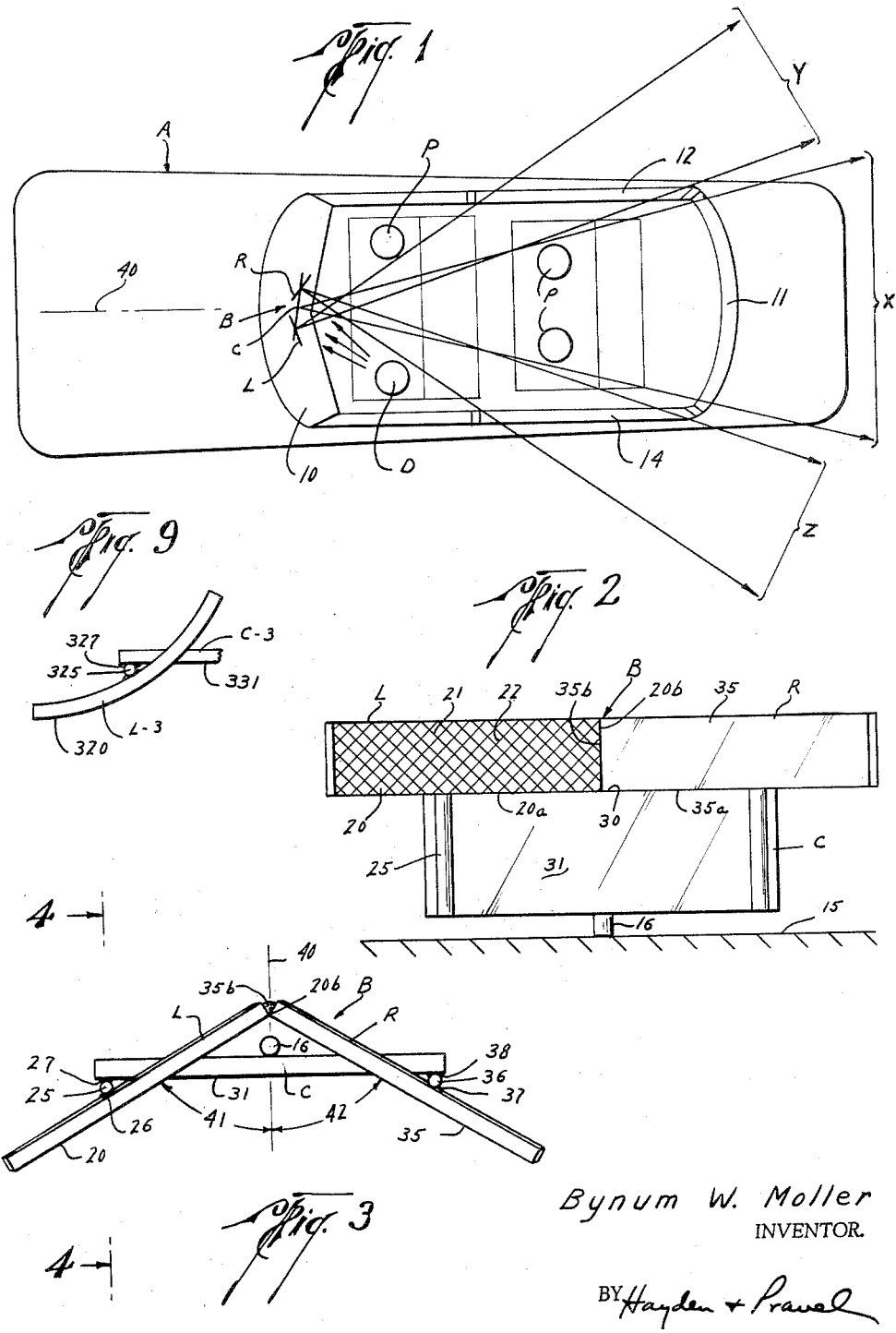

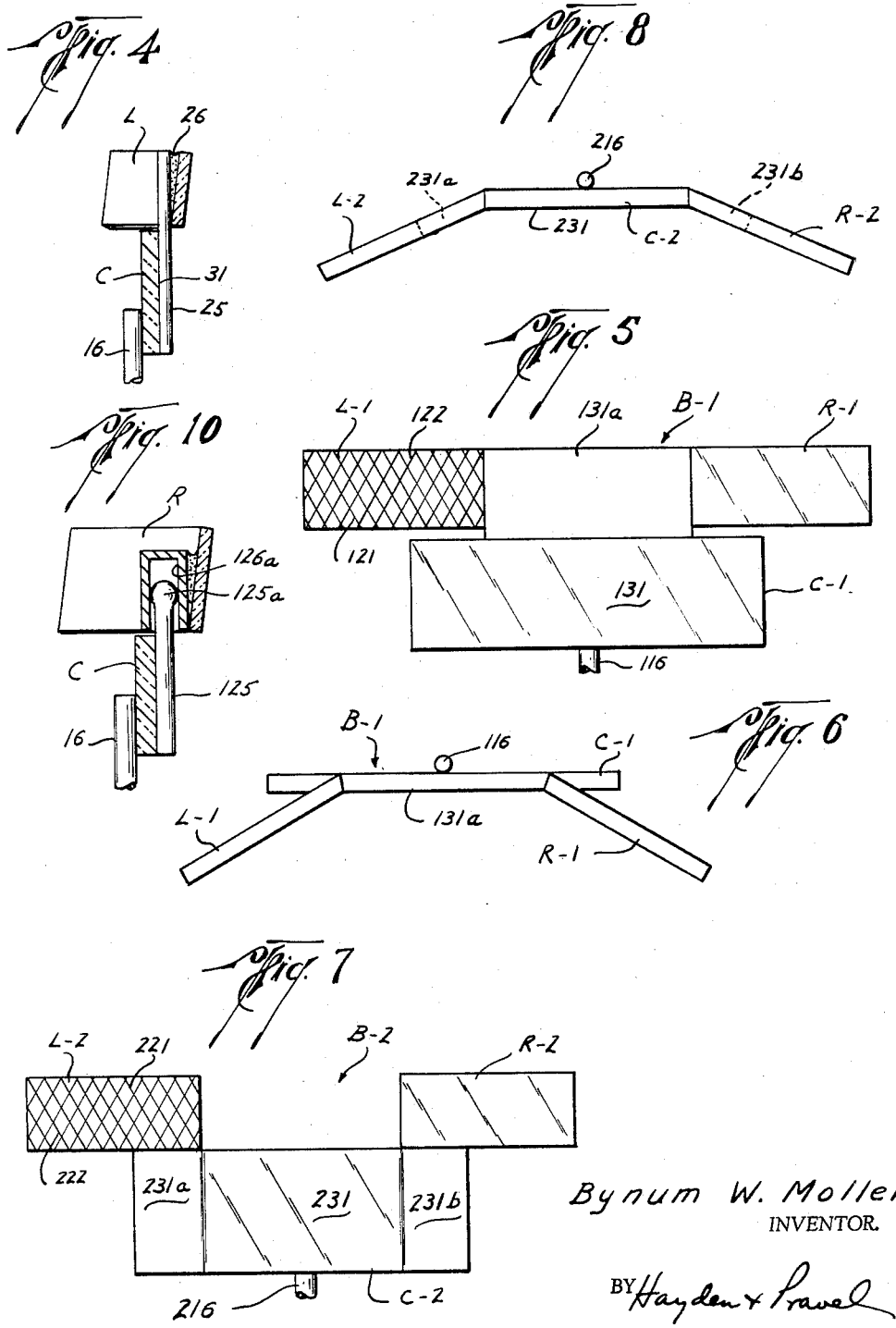

3,151,207
REAR VIEW MIRROR CONSTRUCTION
Bynum W. Moller, P.O. Box 3494, Victoria, Tex.
Filed June 22, 1962, Ser. No. 204,426
3 Claims. (Cl. 88—86)

This invention relates to new and useful improvements in rear view mirror constructions for automobiles and other vehicles.

As most people who drive automobiles and other vehicles are well aware, the rear view mirrors heretofore available have blind spots or areas outside of the left and right hand rear corners of the automobile or other vehicle. Although some efforts have been made in the past to provide adequate viewing of such corner areas, so far as is known, no satisfactory mirror construction has heretofore been provided.

It is an object of the present invention to provide a new and improved mirror construction which is adapted to be used by the driver of an automobile or other vehicle for viewing the outside areas at the rear corners of the automobile or other vehicle, whereby greater convenience and safety is provided.

An important object of this present invention is to provide a new and improved mirror construction having a first mirror for viewing the outside area substantially directly to the rear of an automobile or other vehicle, a second mirror positioned at an angle and at the right hand portion of the first mirror for permitting the driver to view the outside area at the left hand corner of the automobile or other vehicle, and a third mirror positioned at an opposite angle to that of the second mirror and at the left hand portion of the first mirror for permitting the driver to view the outside area at the right hand corner of the automobile or other vehicle.

Another object of this invention is to provide a new and improved mirror construction wherein a mirror is positioned to the right of the longitudinal center line of an automoble or other vehicle and is at an angle for viewing the outside area at the left rear corner of the automobile or other vehicle.

A further object of this invention is to provide a new and improved mirror construction wherein a mirror is positioned to the left of the longitudinal center line of an automobile or other vehicle and is at an angle for viewing the outside area at the right rear corner of the automobile or other vehicle.

Still a further object of this invention is to provide a new and improved mirror construction for automobiles and the like wherein a mirror has diagonal lines thereon for providing an interrupted view of the background or scenery so as to avoid a hypnotic effect and a distorted view of vehicles in such mirror, particularly when such mirror is used for viewing the outside area at the right rear corner of the automobile or the like.

A particular object of this invention is to provide a new and improved mirror construction wherein a pair of auxiliary mirrors are attached to or made integral with a conventional rear view mirror which is adapted to be positioned on the inside of an automobile or other vehicle and at substantial the central area thereof.

Still another object of this invention is to provide a new and improved mirror construction which includes a mirror attachment having a stem therewith for attachment to an ordinary rear view mirror at such an angle that one of the areas outside of the rear corners of an automobile or other vehicle may be viewed by the driver.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a plan view for schematically illustrating the mirror construction of this invention;

FIG. 2 is an elevation illustrating one form of the mirror construction of this invention;

FIG. 3 is a plan view of the form of the invention shown in FIG. 2;

FIG. 4 is a view taken from the left hand side of FIG. 3;

FIG. 5 is an elevation illustrating another form of the mirror construction of this invention;

FIG. 6 is a plan view of the form of the mirror construction shown in FIG. 5;

FIG. 7 is an elevation of a third form of the mirror construction of this invention;

FIG. 8 is a plan view illustrating the form of the invention shown in FIG. 7;

FIG. 9 is a plan view of the left hand portion of a fourth form of the present invention; and FIG. 10 is a view, partly in section, of a modified means for attaching one mirror to another.

In the drawings, the letter A designates generally an automobile or other vehicle in which the mirror construction B of this invention is adapted to be mounted. Briefly, the mirror construction B of this invention includes a central rear view mirror C, a mirror L which is on the left hand portion of the central mirror C, and a third mirror R which is on the right hand portion of the central mirror C. The mirrors L and R may be fixed together or integrally formed together for stability and ease of attachment or adjustment. For purposes of illustration, FIG. 1 illustrates a driver D in the automobile or vehicle A and a passenger P in the front seat with the driver D. The mirror construction B is shown as mounted inside of the automobile or vehicle A in the vicinity of the windshield 10. The driver D is thus able to view all three of the mirrors C, L and R. Such mirrors C, L and R are positioned so that the driver D can view the area X to the rear of the automobile or vehicle A through the central mirror C. The outside area X to the rear of the automobile or vehicle A is thus viewed through the rear window or glass 11 of the automobile or vehicle A. The mirror L is mounted at an angle with respect to the central mirror C so that the driver D is able to view the outside area at the right hand corner as indicated at Y, which view is provided through the rear side windows 12 on the right hand side of the automobile or vehicle A. The mirror R is positioned at an angle with respect to the central mirror C so that the driver D may view the area Z which is outside of the left hand corner of the automobile or vehicle A, which view is through the left hand windows 14 at the left rear of the automobile or vehicle A. Thus, with the mirror construction B of this invention, the areas Y and Z which are normally blind areas to the driver D are made visible. It should be especially noted that none of the areas X, Y, and Z is obstructed by the driver D or any of the passengers P since the position of the mirrors allows the reflection lines to cross the center area of the vehicle A and go between the driver D and the passenger P in the front seat and to the outside of the passengers P in the back seat so that the view of the areas X, Y and Z is unobstructed by the heads or bodies of the driver or passengers.

Considering the invention more in detail, and particularly the form of the invention illustrated in FIGS. 2–4, the mirror construction B includes the central mirror C, the left hand mirror L and the right hand mirror R which have previously been referred to. The central mirror C is an ordinary rear view mirror and it may be mounted on the ledge just above the dashboard of an automobile or vehicle, or it may be suspended from the interior ceiling or roof of the automobile or vehicle A in the vicinity of the windshield 10. For the purposes of illustration, the central mirror C is shown as if it were mounted on the ledge 15 (FIG. 2) just above the dashboard in the automobile or vehicle A by means of a support post 16 or other suitable mounting means. The usual swivel adjustment means with the post 16 may be provided if desired so as to accurately position the mirror section C for viewing the outside area X directly to the rear of the automobile or vehicle A.

With the central mirror C mounted as shown in FIG. 2 on the ledge 15 in the vicinity of the windshield 10, the auxiliary mirrors L and R are mounted above the central mirror C. In the form of the invention shown in FIGS. 2–4, the mirrors L and R are in the form of attachments.

The mirror L has a flat reflecting surface 20 which includes a plurality of spaced parallel lines 21 which run diagonally and cross with oppositely angled diagonal lines 22 so as to provide a crossing diagonal pattern on the face of the mirror L. Such lines provided for an interrupted view of the background or scenery when the driver D is viewing through the mirror L the outside area Y at the right hand corner of the automobile or vehicle A. In the absence of such lines 21 or 22, or both, the movement of the scenery, as viewed by the driver D, produces a hypnotic effect and makes it difficult to view the automobiles or vehicles that might approach such area Y. However, with the lines 21 or 22, or both, any vehicles which enter the outside area Y may be readily viewed through the mirror L by the driver D without the hypnotic effect which might otherwise be present.

The mirror L has a stem 25 which is bonded thereto with any suitable type of bonding agent such as an epoxy resin glue 26 (FIGS. 3 and 4). The stem 25 is attached to the front face 31 of the mirror C with a similar type of bonding agent indicated at 27. The stem 25 may be rigid or flexible, but preferably the stem is made of a material such as a heavy copper wire which is flexible enough to be bent to selected angles or positions for accurately positioning the mirror L in each vehicle. It is to be noted from FIGS. 2 and 4 that the mirror L is mounted so that the lower edge 20a of the mirror L rests upon, and preferably is also bonded to, the upper edge 30 of the central mirror C so that the mirror L is thus supported in part by the mirror C. Also, as shown in FIG. 3, the inner edges 20b and 35b of the mirrors L and R, respectively, are preferably in contact with each other and bonded thereto by a glue such as an epoxy resin. The stem 25 preferably extends substantially vertically or parallel to the face 31 of the mirror C as shown in FIG. 4, but the mirror L is angled so that it slopes away from the stem 25 near its upper end. Therefore, the mirror L is at a slight downward angle of inclination which may be as small as one or two degrees from the vertical axis of the stem 25. Such downward angle of the mirror L permits the mirror L to be placed above the mirror C but at the same time the same horizontal area is viewed by both of such mirrors C and L. In other words, since the mirror L is positioned above the central mirror C in the form shown in FIGS. 2–4, the driver D would view an area in the mirror L above that in the mirror C if the vertical planes were in alignment on both of such mirrors L and C. However, by angling the mirror L slightly downwardly as illustrated in FIGS. 3 and 4, the driver D views the same horizontal area in both of the outside areas X and Y so that vehicles in either of such areas are visible to the driver D.

The mirror R which is mounted at an angle for viewing the outside area Z to the left at the rear of the automobile A is similar to the mirror L except that it is mounted at the opposite angle and ordinarily does not have the diagonal lines 21 and 22. The angle of the mirror R to the direction of movement of the vehicle is relatively small and therefore the scenery movement is not enough to be hypnotic. The reflection surface 35 of the mirror R is flat as indicated in FIGS. 2 and 3. A stem 36 which corresponds with the stem 25 is bonded to the back of mirror R with a suitable bonding agent 37 which may be an epoxy resin glue or any suitable material. Likewise, the stem 36 is bonded with a suitable bonding agent 38 to the face 31 of the central mirror C on its right hand portion. The lower edge 35a rests upon, and preferably is bonded to, the upper edge 30 of the central mirror C so as to partially support the mirror R on the central mirror C. The mirror R is angled slightly downwardly in the same manner as heretofore described in connection with the mirror L so that the same general horizontal area is viewed by the mirror R and the mirror C in their respective outside areas Z and X.

It is to be noted that the mirror L is normally positioned to the left of the longitudinal central line through the automobile A while the mirror R is positioned to the right of such longitudinal central line. Such longitudinal central line is indicated at 40 in FIGS. 1 and 3. The angle 41 between the face 20 and the longitudinal central line 40 is generally less than the angle 42 between the face 35 and the longitudinal central line 40, although such angles may be varied as necessary for a proper viewing of the respective areas Y and Z. It should be pointed out that in some automobiles or other vehicles, their construction will permit the positioning of the entire mirror construction B further to the left than shown in FIG. 1, in which case, the mirror R may be partially or entirely to the left of the longitudinal central line 40 of the vehicle A. Likewise, in some instances the mirror construction B may be placed so as to position the mirror L partially or entirely to the right of the longitudinal central line 40 of the vehicle A. However, the preferred positions are as illustrated in FIGS. 1 and 3. It will also be appreciated that if the central mirror C is mounted so as to be hanging or suspended from the ceiling or upper portion of the windshield frame, the mirrors L and R might be mounted below the mirror C and if so, the angle of inclination of such mirrors C and B from the vertical would be slightly upwardly so that again the same general horizontal area would be viewed in all three mirrors in their respective areas.

In the operation or use of the form of the invention shown in FIGS. 2–4, the mirrors L and R are mounted on the mirror C with the adhesive or other bonding agent 27 and 38, respectively. Such mirrors L and R are positioned so as to view the areas Y and Z, respectively. The driver D can thus readily distinguish the areas he is viewing because of the distinct separation between the central mirror section C and the other mirror sections L and R. Thus, when the driver views the mirror C, he realizes that he is viewing the area directly to the rear of the automobile. When the driver views the mirror L he is focusing his attention on the single mirror L which shows the right hand outside area Y. The driver may likewise view only the mirror R so as to see the left hand outside area Z. Such mirror construction B thus provides views of the important rear areas outside of the automobile or vehicle A and avoids confusion by having such mirrors separate and distinct from each other and at different horizontal levels from each other. It would also be advantageous to have mirrors L and R of a slightly darker shade so that instantaneous identification of L and R over C would be aided even more.

In FIGS. 5 and 6, another form of the invention is shown wherein the mirror construction B-1 includes a central mirror C-1, a second mirror L-1 and a third mirror R-1. The central mirror C-1 is adapted to be mounted on any suitable post 116 which corresponds with the post 16 described heretofore in connection with FIG. 2. The mirrors C-1, L-1 and R-1 are integrally connected by means of an upwardly extending support section 131a which extends above the reflective portion or surface 131. The extension 131a is preferably non-reflective, and in the usual case would be black or other similar non-reflective color. As illustrated, the mirror L-1 is formed integrally with the non-reflective extension 131a and to the left hand side thereof.

In the usual case, the mirror L-1 has spaced parallel lines 121 and 122 for the same purpose as the lines 21 and 22 of FIG. 2. The mirror R-1 is formed integrally with the extension 131a and extends to the right thereof.

The mirrors L-1 and R-1 are placed at substantially the same angles with respect to the longitudinal axis of the automobile or other vehicle as indicated for the mirrors L and R in FIG. 3. It will be understood that the mirror construction B-1 of FIGS. 5 and 6 is used in the same manner as described heretofore in connection with the mirror construction B. Thus, the central mirror C-1 is used for viewing the outside area X directly to the rear of the automobile A, the mirror R-1 is used for viewing the area Z to the outside corner of the automobile A, and the mirror L-1 is used for viewing the area Y to the outside corner on the right hand rear of the automobile or vehicle A. The mirrors L-1 and R-1 are normally inclined slightly downwardly in the same manner as explained heretofore in connection with the mirrors L and R.

In FIGS. 7 and 8 a second modification of the mirror construction B-2 is illustrated. The mirror construction B-2 has a central mirror C-2, and auxiliary mirrors L-2 and R-2, all of which are formed integrally, or are otherwise connected together. The entire mirror construction B-2 is adapted to be supported upon a conventional mirror post 216 which corresponds with the post 16 heretofore described in connection with FIG. 2. The mirror C-2 has a central section 231 which is reflective and which is positioned for viewing the rear area X (FIG. 1). A section 231a which is preferably non-reflective is formed to the left of the central section 231. The mirror L-2 is formed integrally with such section 231a as best seen in FIG. 7. The mirror L-2 and the section 231a are both preferably in the same plane which is at an angle to the central section 231 of the center mirror C-2 (FIG. 8).

The center mirror C-2 also has a right hand portion or section 231b which is also preferably black or otherwise non-reflective. The mirror R-2 is formed integrally with or is connected to the right hand section 231b. The mirror R-2 and the section 231b preferably lie in the same plane and are at an angle with respect to the central section 231 of the center mirror C-2. The angle at which the mirrors L-2 and R-2 are placed will depend upon the position of the mirror in the automobile or vehicle A and would correspond with the positions heretofore described in connection with FIG. 3. The use of the mirror construction B-2 corresponds with the use of the mirror construction B and therefore the mirror L-2 preferably has crossing diagonal lines 221 and 222.

In FIG. 9, the left hand portion of another form of the invention is illustrated wherein the center mirror C-3 is only partially illustrated. Such center mirror C-3 is identical with the center mirror C of FIG. 2. A convex mirror L-3 is shown in FIG. 9 as secured to the front face 331 of the center mirror C-3 by means of a stem 325, adhesive 326 bonding the stem 325 to the mirror L-3, and adhesive 327 bonding the stem 325 to the face 331. The mirror L-3 is in all respects identical with the mirror L, except that it is convex on its reflective surface 320 rather than being flat as is the case with the reflective surface 20 on the mirror L.

In FIG. 10, a modification wherein a flexible joint for mounting the mirrors R and L to the center mirror C is shown. Such flexible joint includes a post or stem 125 having a ball 125a at its upper end which is adapted to be forced into the bore or socket 126a of the tube 126. Such tube 126 is bonded or otherwise attached to the mirror R in FIG. 10; the same type of mounting could be used for attaching the mirror L to the mirror C if desired.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:
1. A mirror construction, comprising:
 (a) a first rear view mirror mounted in the interior of a vehicle for viewing the outside area rearwardly thereof,
 (b) a second rear view mirror connected to said first mirror at the right hand portion thereof for viewing the outside area at the left hand rear corner of the vehicle,
 (c) a third rear view mirror connected to said first mirror at the left hand portion thereof for viewing the outside area at the right hand rear corner of the vehicle, and
 (d) said second and third rear view mirrors each having crossing diagonal lines thereon for providing an interrupted view of the background scenery so as to avoid a hypnotic effect while permitting a clear view of vehicles in said area outside of the left and right rear corners of the vehicle.

2. A mirror construction, comprising:
 (a) a first rear view mirror mounted in the interior of a vehicle for viewing the outside area rearwardly thereof,
 (b) a second rear view mirror formed integrally with said first mirror above the right hand portion thereof for viewing the outside area at the left hand rear corner of the vehicle,
 (c) a third rear view mirror formed integrally with said first mirror above the left hand portion thereof for viewing the outside area at the right hand rear corner of the vehicle, and
 (d) said second and third mirrors each having crossing diagonal lines thereon to enable the viewer to instantly distinguish the view therein from said first rear view mirror while also avoiding a hypnotic effect from the angular positions thereof.

3. A mirror construction, comprising:
 (a) a first rear view mirror mounted in the interior of a vehicle for viewing the outside area rearwardly thereof,
 (b) a second rear view mirror connected to said first mirror above the right hand portion thereof for viewing the outside area at the left hand rear corner of the vehicle,
 (c) a third rear view mirror connected to said first mirror above the left hand portion thereof for viewing the outside area at the right hand rear corner of the vehicle, and
 (d) said second and third mirrors each having crossing diagonal lines thereon to enable the viewer to instantly distinguish the view therein from said first rear view mirror while also avoiding a hypnotic effect from the angular positions thereof.

References Cited in the file of this patent

UNITED STATES PATENTS

| | | |
|---|---|---|
| 1,114,559 | Weed | Oct. 20, 1914 |
| 1,311,253 | Stern | July 29, 1919 |
| 1,426,010 | Rees | Aug. 15, 1922 |
| 1,663,672 | Therasse | Mar. 27, 1928 |
| 2,214,639 | Lenta | Sept. 10, 1940 |
| 2,279,751 | Hensley | Apr. 14, 1942 |
| 2,605,676 | Couch | Aug. 5, 1952 |
| 2,780,959 | Mannon | Feb. 12, 1957 |
| 2,909,204 | Somerville | Oct. 20, 1959 |
| 3,009,392 | Snell | Nov. 21, 1961 |
| 3,021,756 | Milton et al. | Feb. 20, 1962 |
| 3,028,794 | Kinkella | Apr. 10, 1962 |
| 3,048,084 | Iannuzzi | Aug. 7, 1962 |
| 3,104,274 | King | Sept. 17, 1963 |